(12) United States Patent
Linde et al.

(10) Patent No.: US 10,820,519 B2
(45) Date of Patent: Nov. 3, 2020

(54) AGRICULTURAL CHOPPER WITH LINKED COUNTER KNIVES AND SHEAR BAR

(71) Applicant: CNH Industrial America LLC, New Holland, PA (US)

(72) Inventors: Cooper W. Linde, Lancaster, PA (US); Mark D. Dilts, New Holland, PA (US); Nathan E. Isaac, Lancaster, PA (US); Austin L. Jackson, Jackson, SC (US)

(73) Assignee: CNH Industrial America LLC, New Holland, PA (US)

( * ) Notice: Subject to any disclaimer, the term of this patent is extended or adjusted under 35 U.S.C. 154(b) by 202 days.

(21) Appl. No.: 16/172,065

(22) Filed: Oct. 26, 2018

(65) Prior Publication Data

US 2019/0059219 A1     Feb. 28, 2019

Related U.S. Application Data

(62) Division of application No. 14/880,181, filed on Oct. 9, 2015, now Pat. No. 10,111,384.

(51) Int. Cl.
| | | |
|---|---|---|
| *A01F 12/40* | (2006.01) | |
| *A01D 41/12* | (2006.01) | |
| *A01F 29/09* | (2010.01) | |

(52) U.S. Cl.
CPC .......... *A01F 12/40* (2013.01); *A01D 41/1243* (2013.01); *A01F 29/095* (2013.01)

(58) Field of Classification Search
CPC .......... A01F 12/40; A01F 29/02; A01F 29/04; A01F 29/06; A01F 29/095; A01D 41/1243
See application file for complete search history.

(56) References Cited

U.S. PATENT DOCUMENTS

| | | | |
|---|---|---|---|
| 2,626,159 | A | 4/1949 | Thompson |
| 5,928,080 | A | 7/1999 | Jakobi |
| 6,120,373 | A | 9/2000 | Schrattenecker |
| 6,152,820 | A | 11/2000 | Heidjann et al. |

(Continued)

FOREIGN PATENT DOCUMENTS

| | | |
|---|---|---|
| DE | 19722793 A1 | 12/1998 |
| EP | 0415419 A2 | 3/1991 |
| FR | 2998443 A1 | 5/2014 |

OTHER PUBLICATIONS

European Search Report; 16192987.2-1656; dated Jan. 30, 2017.

*Primary Examiner* — Alicia Torres
(74) *Attorney, Agent, or Firm* — Patrick Sheldrake; Peter Zacharias

(57) ABSTRACT

An agricultural harvester includes a chassis; a threshing and separating assembly carried by the chassis; and a chopper assembly carried by the chassis that receives crop material from the threshing and separating assembly. The chopper assembly includes at least one movable chopping knife; a plurality of counter knives movable between a first knife position and a second knife position, the plurality of counter knives configured to cooperate with the at least one chopping knife to cut crop material when in the first knife position; a shear bar movable between a first bar position and a second bar position; and a linkage assembly connected to the plurality of counter knives and the shear bar such that the linkage assembly is selectively actuable to simultaneously move the plurality of counter knives and the shear bar between their respective first and second positions.

8 Claims, 9 Drawing Sheets

(56) References Cited

U.S. PATENT DOCUMENTS

| | | | |
|---|---|---|---|
| 7,862,413 B2 | 1/2011 | Isaac et al. | |
| 10,201,128 B2 * | 2/2019 | Weichholdt | A01D 41/00 |
| 2014/0326815 A1 | 11/2014 | Dilts et al. | |
| 2015/0038201 A1 | 2/2015 | Brinkmann et al. | |

* cited by examiner

AGRICULTURAL CHOPPER WITH LINKED COUNTER KNIVES AND SHEAR BAR

CROSS REFERENCE TO RELATED APPLICATIONS

This is a division of U.S. patent application Ser. No. 14/880,181, entitled "AGRICULTURAL CHOPPER WITH LINKED COUNTER KNIVES AND SHEAR BAR", filed Oct. 9, 2015, which is incorporated herein by reference.

BACKGROUND OF THE INVENTION

1. Field of the Invention

The present invention relates to agricultural harvesters, and, more particularly, to choppers for agricultural harvesters.

2. Description of the Related Art

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine through a chopper assembly and discharged back to the field using a spreader system. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

After passing through the threshing and separating system, the coarse non-grain crop material can flow into a chopper assembly to be cut into finer pieces before being spread on the field. Chopping the non-grain crop material into finer pieces increases the surface area of the crop material, allowing for quicker decomposition. One type of chopper assembly that is commonly employed has multiple moving knives that cooperate with stationary counter knives to chop the crop material into finer pieces. A shear bar can also be placed after the stationary counter knives to impede the flow of the crop material through the chopper assembly and increase the chop quality.

In certain cases, the user may not want the crop material that passes through the chopper assembly to be cut into finer pieces. In such instances, the user can switch the chopper assembly from a chopping mode where the counter knives are raised to cooperate with the moving knives to chop the crop material and a disengaged mode where the counter knives are lowered so that the counter knives do not cooperate with the moving knives. When the counter knives are lowered, the moving knives simply push any contacted crop material toward the rear of the combine with minimal chopping. However, the shear bar is typically bolted in the chopper assembly and does not lower when the counter knives are placed in the disengaged mode. As such, the shear bar can unnecessarily impede crop material flow through the chopper assembly in disengaged mode and provide resistance that causes chopping of the crop material when no chopping is desired.

What is needed in the art is a chopper assembly that can overcome some of the previously described disadvantages of the prior art.

SUMMARY OF THE INVENTION

The present invention provides a plurality of counter knives and a shear bar that are both connected to a linkage assembly, allowing the counter knives and shear bar to be simultaneously moved between different positions.

The invention in one form is directed to an agricultural harvester including a chassis; a threshing and separating assembly carried by the chassis; and a chopper assembly carried by the chassis that receives crop material from the threshing and separating assembly. The chopper assembly includes at least one movable chopping knife; a plurality of counter knives movable between a first knife position and a second knife position, the plurality of counter knives configured to cooperate with the at least one chopping knife to cut crop material when in the first knife position; a shear bar movable between a first bar position and a second bar position; and a linkage assembly connected to the plurality of counter knives and the shear bar such that the linkage assembly is selectively actuable to simultaneously move the plurality of counter knives between the first knife position and the second knife position and the shear bar between the first bar position and the second bar position.

The invention in another form is directed to a chopper assembly for an agricultural harvester including at least one movable chopping knife; a plurality of counter knives movable between a first knife position and a second knife position, the plurality of counter knives configured to cooperate with the at least one chopping knife to cut crop material when in the first knife position; a shear bar movable between a first bar position and a second bar position; and a linkage assembly connected to the plurality of counter knives and the shear bar such that the linkage assembly is selectively actuable to simultaneously move the plurality of counter knives between the first knife position and the second knife position and the shear bar between the first bar position and the second bar position.

An advantage of the present invention is the linkage assembly allows both the counter knives and shear bar to be switched between two different positions by a single movement.

Another advantage is the linkage assembly can be easily adjusted so that the shear bar is not switched between different positions when the counter knives are switched between different positions.

Yet another advantage is the linkage assembly is readily adaptable to be actuated by a variety of different actuators.

Yet another advantage is the linkage assembly has relatively few moving parts, which reduces the amount of space used by the linkage assembly and the amount of tolerance stack-up that can occur.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
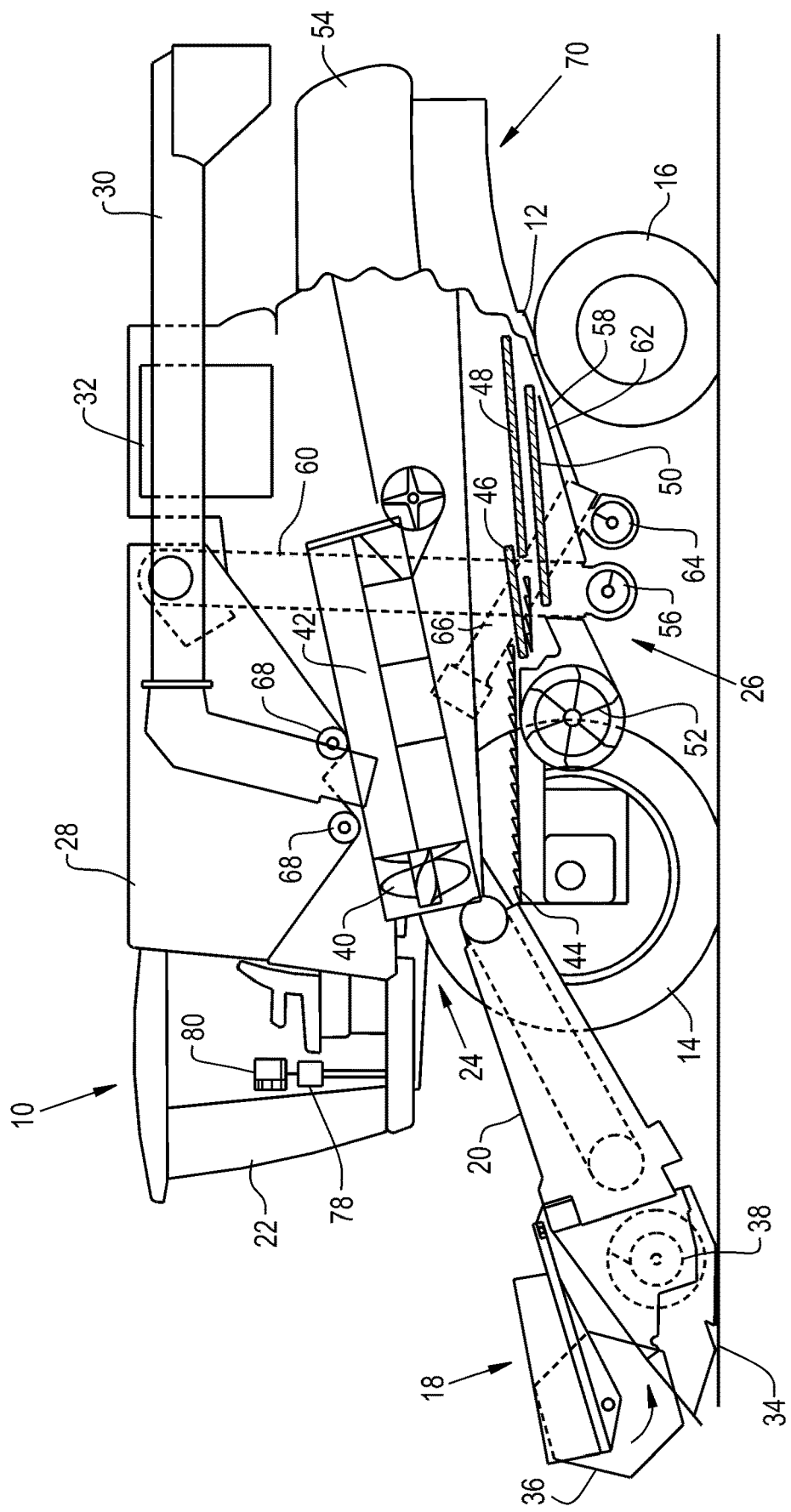
FIG. 1 is a side view of an embodiment of an agricultural harvester according to the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. It should be appreciated that while the crop material is described further herein as grain, the agricultural harvester 10 according to the present invention can be used to collect and process any type of crop material.

Grain which has been separated by the threshing and separating assembly 24 falls onto an auger 44 and is conveyed toward cleaning system 26. Cleaning system 26 may include a pan 46, an upper sieve 48 (also known as a chaffer sieve), a lower sieve 50 (also known as a shoe sieve), and a cleaning fan 52. Grain on sieves 48 and 50 is subjected to a cleaning action by fan 52 which provides an airflow through the sieves to remove chaff and other impurities such as dust from the grain by making this material airborne for discharge from straw hood 54 of combine 10. Pan 46 oscillates in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger 64 via pan 58. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 can include a chopper assembly 72, shown in greater detail in FIGS. 2-7, that can chop the non-grain crop material into finer pieces and a residue spreader (unnumbered) that spreads chopped or unchopped non-grain crop material out the back of the combine 10.

Figure 2:
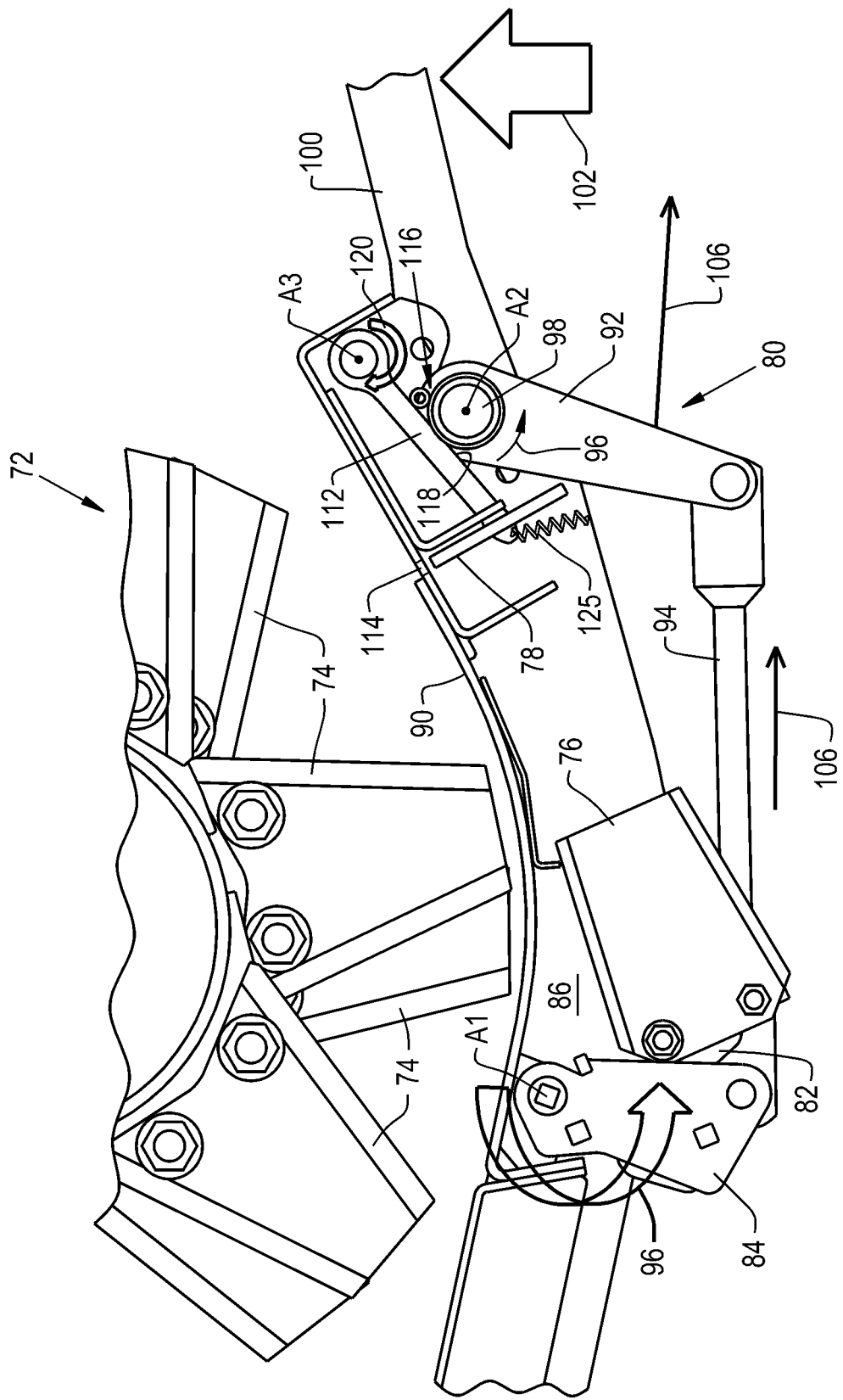
FIG. 2 is a sectional view of an embodiment of a chopper assembly according to the present invention with counter knives and a shear bar connected to a linkage assembly and in a disengaged position.
Figure 3:
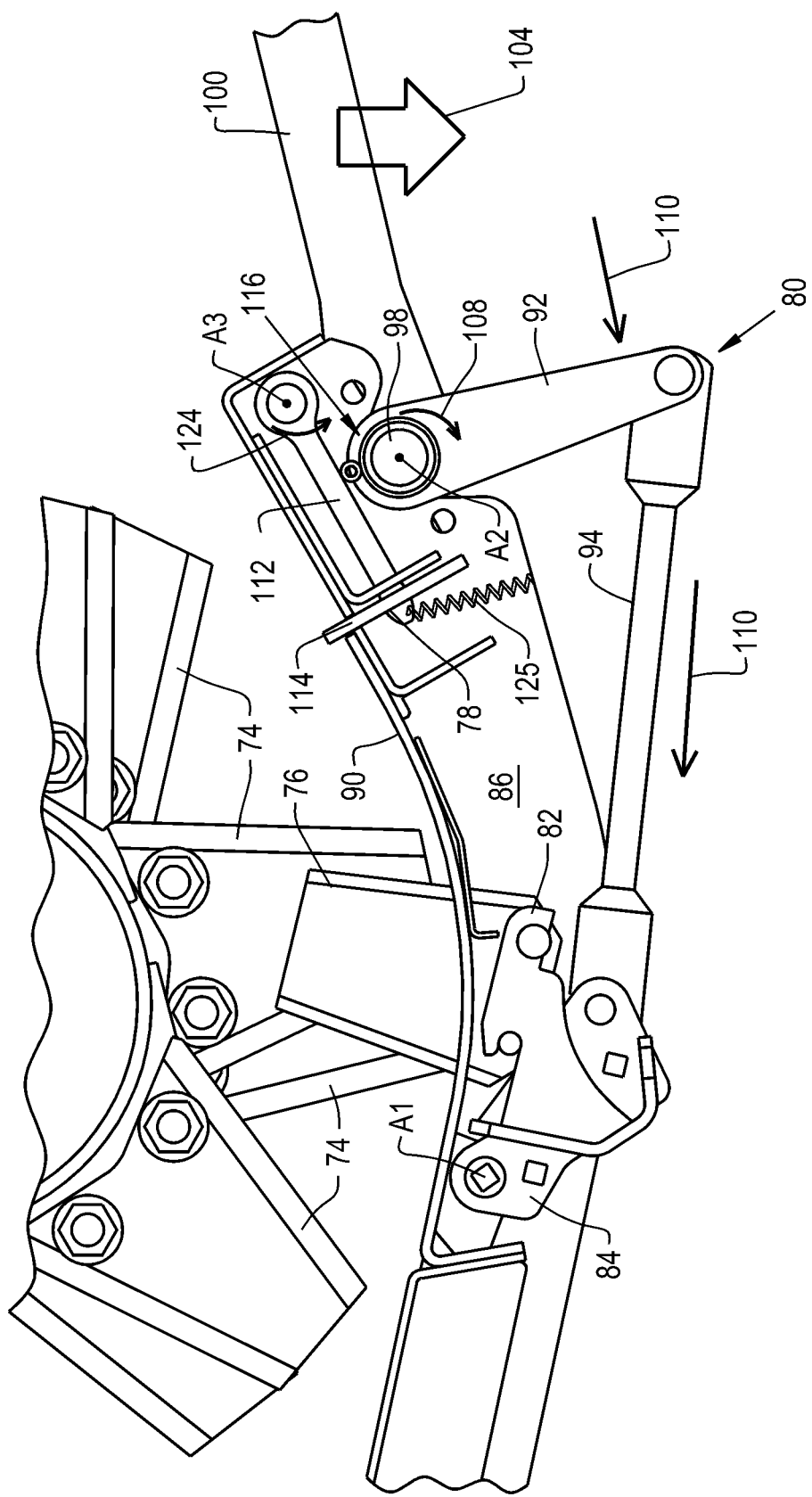
FIG. 3 is a sectional view of the chopper assembly shown in FIG. 2 with the counter knives and shear bar in an engaged position.

Referring now to FIGS. 2-3, an embodiment of the chopper assembly 72 is shown which generally includes movable chopping knives 74, a bank of counter knives 76 that can be moved to different positions to cooperate with the chopping knives 74 to cut crop material, a shear bar 78 that is movable between different positions, and a linkage assembly 80 connected to the counter knives 76 and shear bar 78. The chopping knives 74 can be rotated by a shaft (not shown) to move crop material in the chopper assembly 72 and chop the crop material when the chopper assembly 72 is in a chopping configuration, which is shown in FIG. 3 and described further herein. While the chopping knives 74 are shown as being rotating knives, the chopping knives 74 can be driven to have non-rotating motion. Further, the number of chopping knives 74 can be greatly varied to have as few as one chopping knife to more than one hundred chopping knives.

The counter knives 76 can be carried simultaneously on a knife carrier 82 so that as the knife carrier 82 moves, the counter knives 76 will be simultaneously moved as well. As is known, the counter knives 76 have a space defined between one another that the chopping knives 74 pass through. As the chopping knives 74 pass through the space, the counter knives 76 act as holders for the crop material and provide sufficient resistance to the flow of crop material for the chopping knives 74 to chop through the crop material. In this sense, the counter knives 76 cooperate with the chopping knives 74 to cut crop material when the counter knives 76 are raised in an engaged position, as shown in FIG. 3, so that the chopping knives 74 can travel through the space between the counter knives 76 and chop crop material that is held against the counter knives 76. As shown in FIG. 2, the counter knives 76 can also be moved to a disengaged position where the counter knives 76 do not cooperate with the chopping knives 74 so that the crop material carried by the chopping knives 74 experiences significantly less chopping.

To switch the counter knives 76 between the disengaged and engaged positions, the knife carrier 82 can be connected to a pivoting plate 84 that is pivotally connected to a sheet 86 of the chopper assembly 72 and pivots about a first axis of rotation A1 defined by a bolt or other connector. This allows pivoting of the pivoting plate 84 to also pivot the knife carrier 82 and counter knives 76 through a knife grate 88 (shown in FIGS. 5-6) of a concave 90 of the chopper assembly 72 to engage and disengage the counter knives 76. Once the counter knives 76 are engaged, a locking mechanism (not shown) can be employed to keep the counter knives 76 locked in the engaged position and prevent the counter knives 76 from unintentionally being lowered through the knife grate 88 into the disengaged position.

The shear bar 78 can also be moved between a disengaged position (shown in FIG. 2) and an engaged position (shown in FIG. 3) and be placed past the counter knives 76 in a direction of crop material flow through the chopper assembly 72. In the engaged position, the shear bar 78 can impede a flow of crop material across the concave 90 and thus through the chopper assembly 72. This impediment can provide additional friction at the shear bar 78 for the crop material and improve the chop quality of the finer pieces produced by the chopper assembly 72.

The linkage assembly 80, as shown, is connected to both the counter knives 76 and shear bar 78 such that the linkage assembly 80 can be selectively actuated to move the counter knives 76 and shear bar 78 between at least two different positions, as can be seen in FIGS. 2 and 3. The linkage assembly 80 can include a knife arm 92 that pivots about a shaft 98 defining a second axis of rotation A2 and be linked to the pivoting plate 84 by a linkage rod 94 so that as the knife arm 92 pivots about the second axis of rotation A2 in a pivoting direction, designated as arrow 96 in FIG. 2, the pivoting plate 84 connected to the knife carrier 82 will also pivot about the first axis of rotation A1 in the pivoting direction 96 to move the counter knives 76 through the knife grate 88 into the engaged position. The knife arm 92 can be rotated by the shaft 98 by selectively actuating a handle 100 connected to the shaft 98 so that as the handle 100 is pushed up or down, signified by up arrow 102 in FIG. 2 and down arrow 104 in FIG. 3, to torque the shaft 98 and cause rotation. If desired, the shaft 98 can be rotated by an alternative actuator such as an electric actuator, a pneumatic actuator, or a hydraulic actuator. As the knife arm 92 rotates in the pivoting direction 96, the linkage rod 94 is pulled by the knife arm 92 in a linear direction, designated as arrows 106 in FIG. 2, and pulls the pivoting plate 84 in the linear direction 106 as well to cause the pivoting plate 84 to pivot the knife carrier 82 and counter knives 76 into the engaged position. To return the counter knives 76 to the disengaged position, the knife arm 92 can be rotated in another pivoting direction, designated as arrow 108 in FIG. 3, opposite to the pivoting direction 96 so that the linkage rod 94 is pushed by the knife arm 92 in a linear direction, designated as arrow 110 in FIG. 3, opposite to the linear direction 106 and cause the pivoting plate 84 to pivot the knife carrier 82 and counter knives 76 back through the knife grate 88 to the disengaged position. It should be appreciated that the shown engaged position and disengaged position represent only two of the possible positions that the counter knives 76 can be placed in by selectively actuating the linkage assembly 80 and that the counter knives 76 can be placed in many other positions by varying the amount of selective actuation applied to the linkage assembly 80.

To move the shear bar 78 between different positions, the linkage assembly 80 can include a bar arm 112 that is linked to the shear bar 78 and pivotally connected to the sheet 86 about a third axis of rotation A3 that is not coincident with the second axis of rotation A2 that provides the pivot for the knife arm 92. Such an arrangement allows for the length of the knife arm 92 and bar arm 112 to be easily varied to produce the appropriate amount of movement of the counter knives 76 and shear bar 78, respectively, as the linkage assembly 80 actuates. As the bar arm 112 pivots, the shear bar 78 will be carried by the bar arm 112 to move through a bar opening 114 in the concave 90 to the engaged and disengaged positions. To produce pivoting of the bar arm 112 as the knife arm 92 is pivoted, an engagement cam 116 can be carried by the shaft 98 and engage a surface 118 of the bar arm 112. As the engagement cam 116 is rotated by the shaft 98, the engagement cam 116 can push on the surface 118 of the bar arm 112 to cause pivoting of the bar arm 112 about the third axis of rotation A3, moving the shear bar 78 as the bar arm 112 pivots. The engagement cam 116 can be a circular tube with a projection, best seen in FIG. 4, or have other shapes that allow for camming of the bar arm 112 as the knife arm 92 pivots due to rotation of the shaft 98. As can be seen in FIG. 2, the bar arm 112 can have a shape and arrangement such that as the engagement cam 116 pivots with the knife arm 92 in the pivoting direction 96, the bar arm 112 is forced by the engagement cam 116 to pivot in another pivoting direction, designated as arrow 120 in FIG. 2, that is opposite to the pivoting direction 96 of the knife arm 92 and engagement cam 116 to move the shear bar 78 to the engaged position as shown in FIG. 3. Alternatively, the engagement cam 116 can be replaced with a gear (not shown) on the shaft 98 that is paired with another gear (not shown) linked to the bar arm 112 to cause the bar arm 112 to pivot in the pivoting direction 120 opposite to the pivoting direction 96 of the shaft 98 and raise the shear bar 78 into the engaged position.

To return the shear bar 78 to the disengaged position shown in FIG. 2, the knife arm 92 can be pivoted in a pivoting direction, designated as arrow 108 in FIG. 3, opposite to the pivoting direction 96 so that the engaging cam 116 does not force the surface 118 of the bar arm 112 to pivot in the pivoting direction 120 and allows the bar arm 112 to pivot in a pivoting direction, designated as arrow 124 in FIG. 3, opposite to the pivoting direction 108 and move the shear bar 78 back through the bar opening 114 and under the concave 90, where the shear bar 78 does not impede crop flow through the chopper assembly 72. The weight of the shear bar 78 can be enough to cause the bar arm 112 to pivot about the third axis of rotation A3, but an optional pulling member 125, such as a spring, can be connected to the shear bar 78 and/or bar arm 112 to pull the shear bar 78 and bar arm 112 back toward the disengaged position. As with the counter knives 76, the shown engaged and disengaged positions of the shear bar 78 represent only two of the possible positions that the shear bar 78 can be moved to by selective actuation of the linkage assembly 80. It should thus be appreciated that the counter knives 76 and shear bar 78 can be simultaneously moved to many different positions using the linkage assembly 80.

Figure 4:
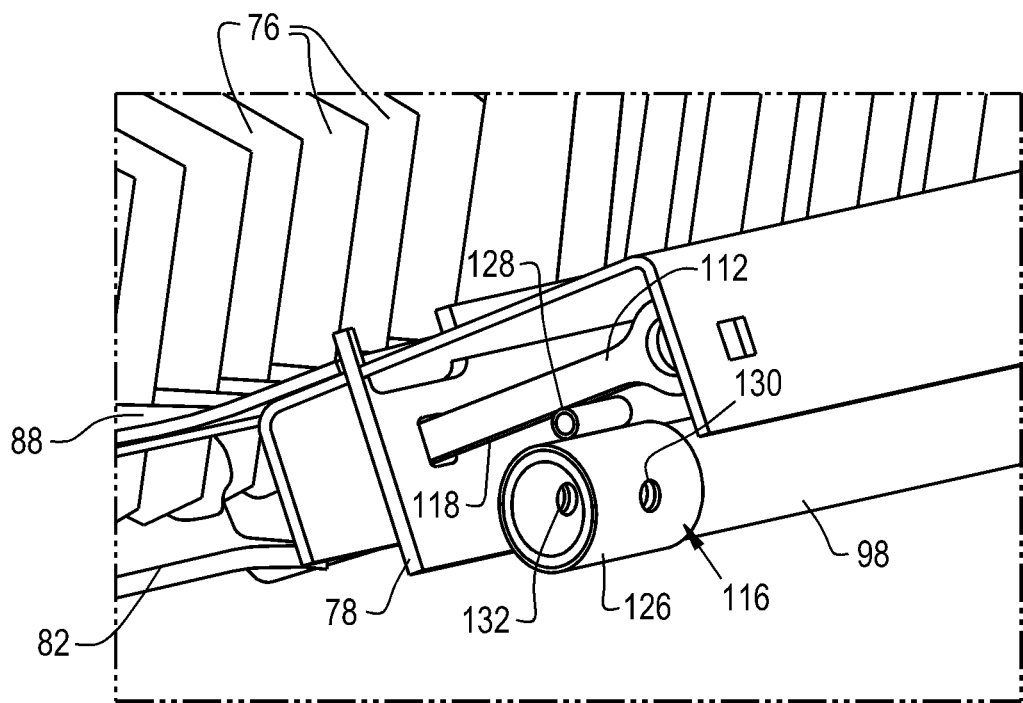
FIG. 4 is a sectional view of a portion of the chopper assembly shown in FIGS. 2-3 with an engagement cam in a camming position.
Figure 5:
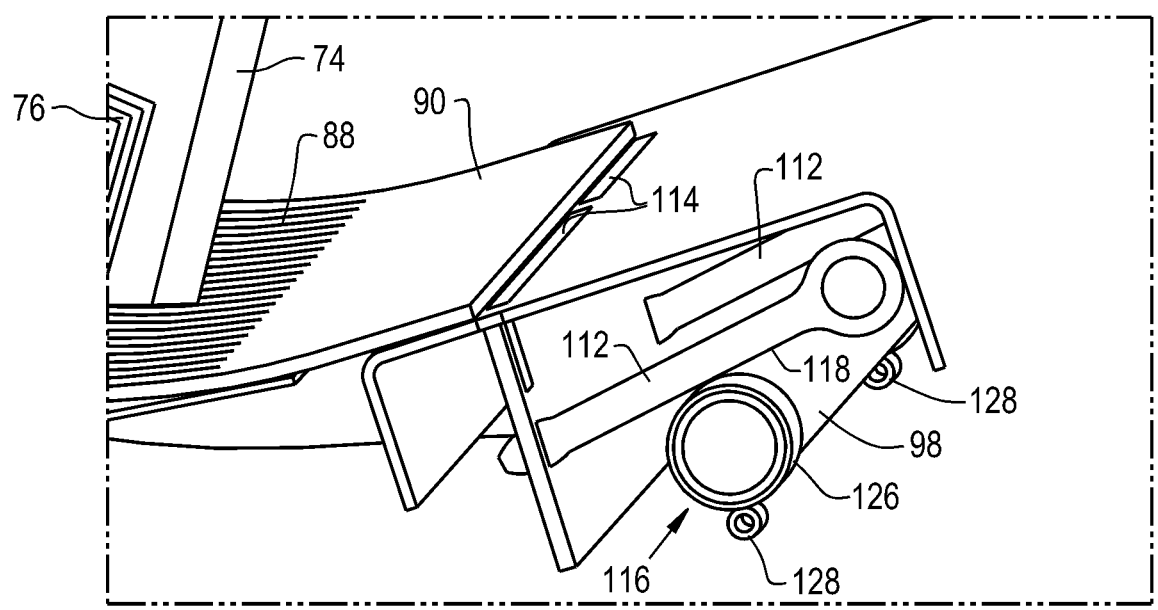
FIG. 5 is a sectional view of the portion of the chopper assembly shown in FIG. 4 with the engagement cam moved to a non-camming position.
Figure 6:
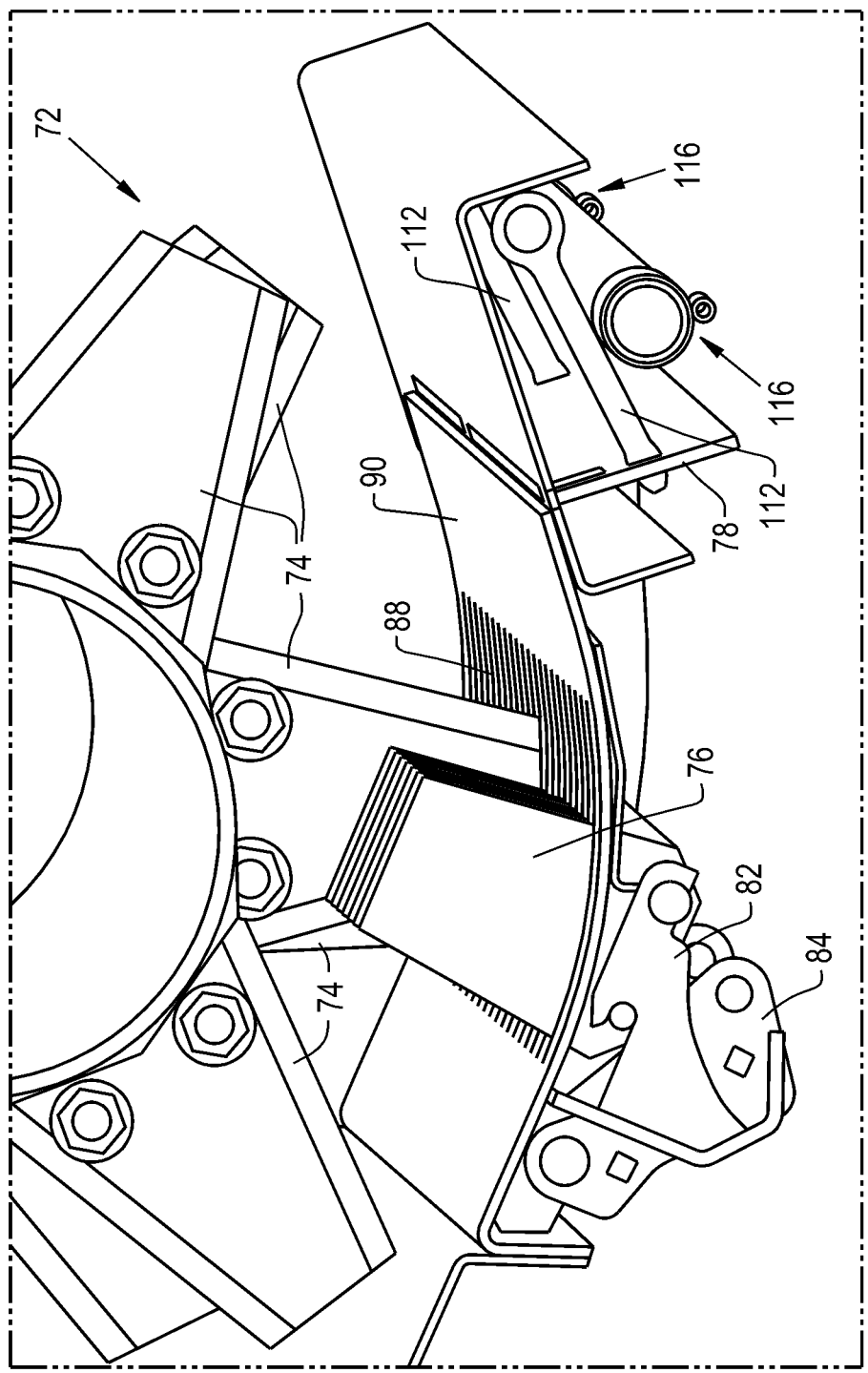
FIG. 6 is a sectional view of the chopper assembly shown in FIGS. 2-5 with the engagement cam in the non-camming position and the counter knives in the engaged position.

Referring now to FIGS. 4-6, the portion of the linkage assembly 80 that moves the shear bar 78 is shown in better detail. As can be seen, the engagement cam 116 can be a circular tube 126 fit over the shaft 98 that has a projection 128 formed thereon that engages with the surface 118 of the bar arm 112. The circular tube 126 can have a pair of openings 130 formed through a diameter of the circular tube 126 that align with a pair of openings 132 formed through a diameter of the shaft 98, allowing a pin or other element (not shown) to be placed through both pairs of openings 130 and 132 to prevent rotation of the engagement cam 116 relative to the shaft 98. If desired, the engagement cam 116 can have shapes other than a circular tube 126 with a projection 130, such as a conventional oblong cam or a square tube fit over the shaft 98. As shown in FIG. 4, the engagement cam 116 is in a camming position where the projection 128 engages the surface 118 of the bar arm 112 to push on the surface 118, allowing the engagement cam 116 to cause the bar arm 112 to pivot as the shaft 98 and engagement cam 116 rotate. As can be seen in FIGS. 5-6, two engagement cams 116 can be placed over the shaft 98 to engage two bar arms 112 connected to the shear bar 78. Rather than relying on the weight of the shear bar 78 or a pulling member 125 to force the shear bar 78 toward the disengaged position, one of the bar arms 112 and/or engagement cams 116 can be shaped and arranged such that each of the engagement cams 116 acts as a counter-cam to the other, with one of the engagement cams causing upward movement of the shear bar 78 when the shaft 98 is rotated in one direction and the other engagement cam causing downward movement of the shear bar 78 when the shaft 98 is rotated in the opposite direction.

In some instances, it may be desired to place the counter knives 76 in the engaged position to chop crop material but also place the shear bar 78 in a disengaged position so that the shear bar 78 does not impede crop flow through the chopper assembly 72. To accomplish this, and referring now to FIG. 5, the circular tube 126 of the engagement cam 116 can be rotated relative to the shaft 98 so that the projection 128 of the engagement cam 116 does not engage the surface 118 of the bar arm 112 and cannot cause pivoting of the bar arm 112 as the shaft 98 and engagement cam 116 rotate. In this position, which can be referred to as a non-camming position, the shear bar 78 does not move simultaneously with the counter knives 76 and can be kept in the disengaged position due to a disengagement force caused by the weight of the shear bar 78, displacement force from the spring 125, and/or a camming force from an engagement cam 116 acting on the shear bar 78 to force and maintain the shear bar 78 below the bar opening 114. As shown in FIG. 6, the counter knives 76 can therefore be moved to the engaged position to cooperate with the chopping knives 74 and cut crop material with the shear bar 78 in the disengaged position and not impeding the flow of crop material through the chopper assembly 72.

Figure 7:
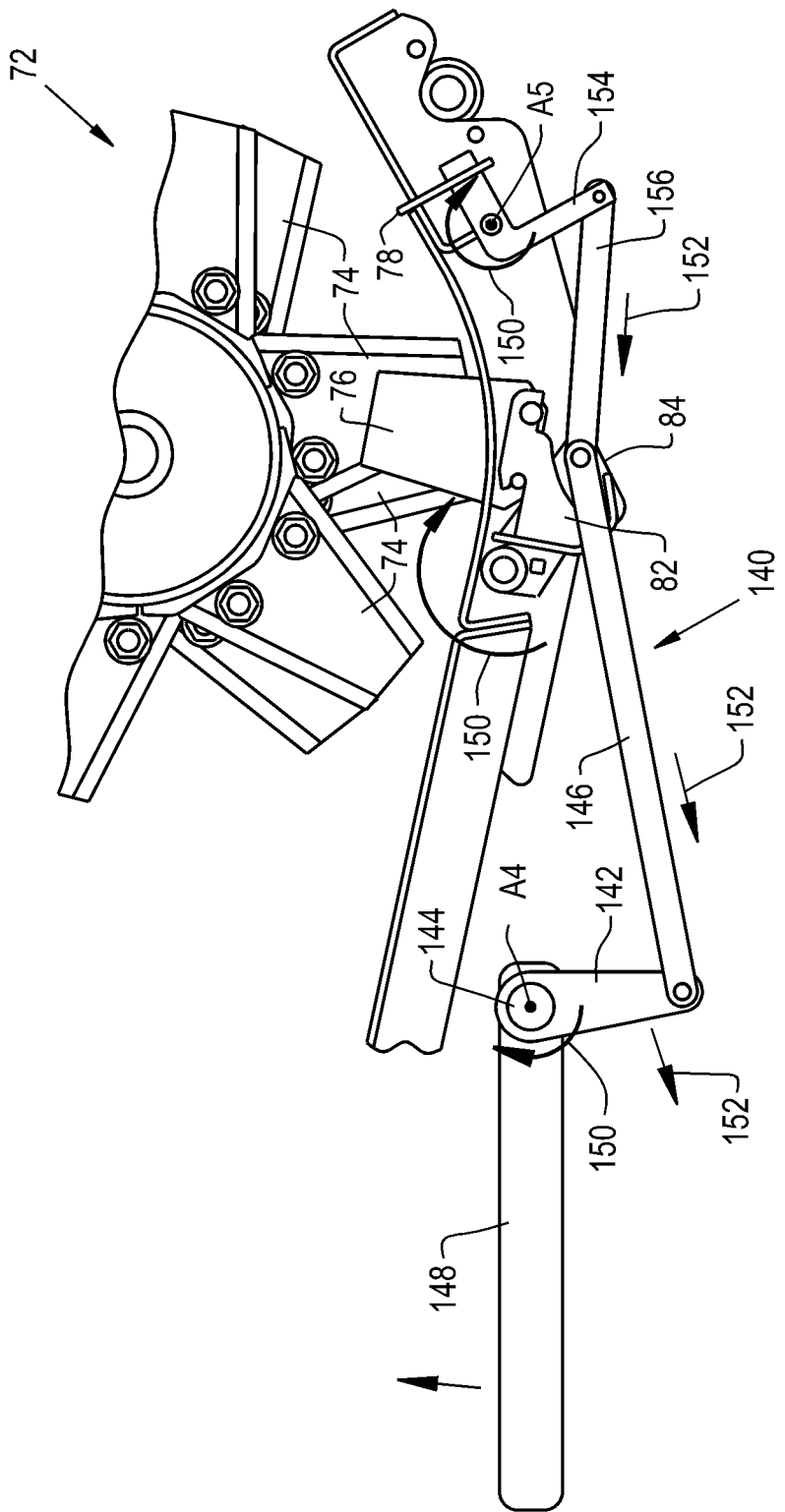
FIG. 7 is a sectional view of the chopper assembly shown in FIG. 2 with an alternate embodiment of a linkage assembly connected to the counter knives and shear bar.

Referring now to FIG. 7, the chopper assembly 72 is shown with an alternative embodiment of a linkage assembly 140 connected to the counter knives 76 and shear bar 78 to simultaneously move the counter knives 76 and shear bar 78 between various positions. As can be seen, the linkage assembly 140 can include a knife arm 142 that pivots about a shaft 144 defining an axis of rotation A4 and is linked to the pivoting plate 84 by a linkage rod 146, similarly to the linkage assembly 80. Selective actuation of a handle 148 connected to the shaft 144 causes the knife arm 142 to pivot about the shaft 144 in a pivoting direction, designated as arrow 150, and cause the linkage rod 146 to be pulled in a linear direction, designated as arrow 152, and thus cause the pivoting plate 84, knife carrier 82 and counter knives 76 to also pivot in the pivoting direction 150. To cause movement of the shear bar 78, a bellcrank 154 can be connected to the shear bar 78 and pivotable about an axis of rotation A5, such as a tube or shaft, such that pivoting of the bellcrank 154 causes linear movement of the shear bar 78. The bellcrank 154 can be formed to have a 90° angle, as shown, or other angles if desired. The bellcrank 154 can be linked to the pivoting plate 84 by a second linkage rod 156 so that as the handle 148 is actuated upward, as shown, the second linkage rod 156 is pulled in the linear direction 152 to cause the bellcrank 154 to pivot in the same pivoting direction 150 as the pivoting plate 84 and linearly move the shear bar 78. As can be seen, the upward movement of the handle 148 causes the shown linkage assembly 140 to move the counter knives 76 and shear bar 78 toward the disengaged position, with movement of the handle 148 in the downward direction causing the linkage assembly 140 to move the counter knives 76 and shear bar 78 toward the engaged position. It should be appreciated that the linkage assembly 140 can also be readily configured so that upward movement of the handle 148 causes the linkage assembly 140 to move the counter knives 76 and shear bar 78 toward the disengaged position and downward movement of the handle 148 causes the linkage assembly 140 to move the counter knives 76 and shear bar 78 toward the engaged position.

Figure 8:
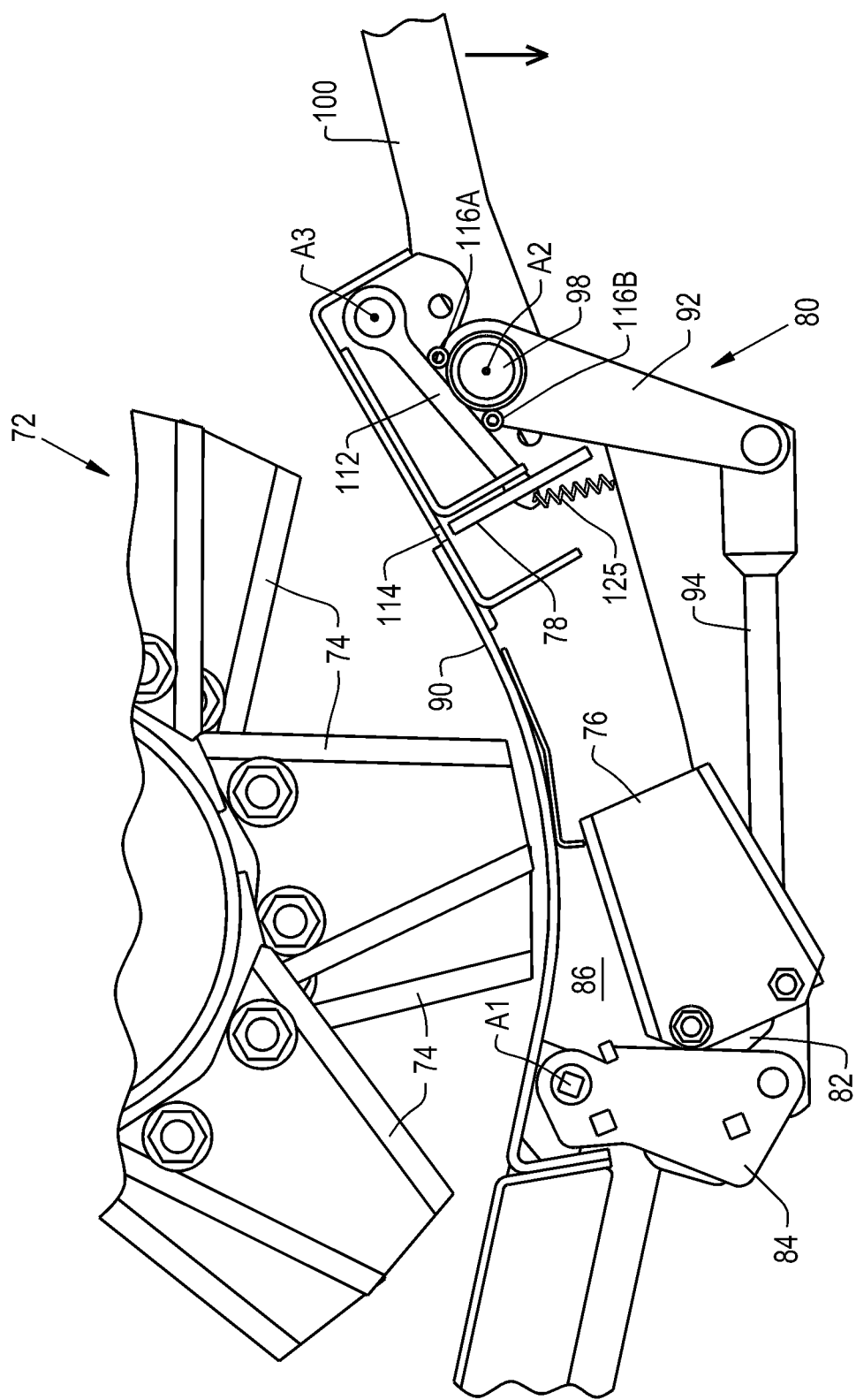
FIG. 8 is a sectional view of the chopper assembly shown in FIG. 2 with the linkage assembly including a second engagement cam and the shear bar and counter knives both in a disengaged position.
Figure 9:
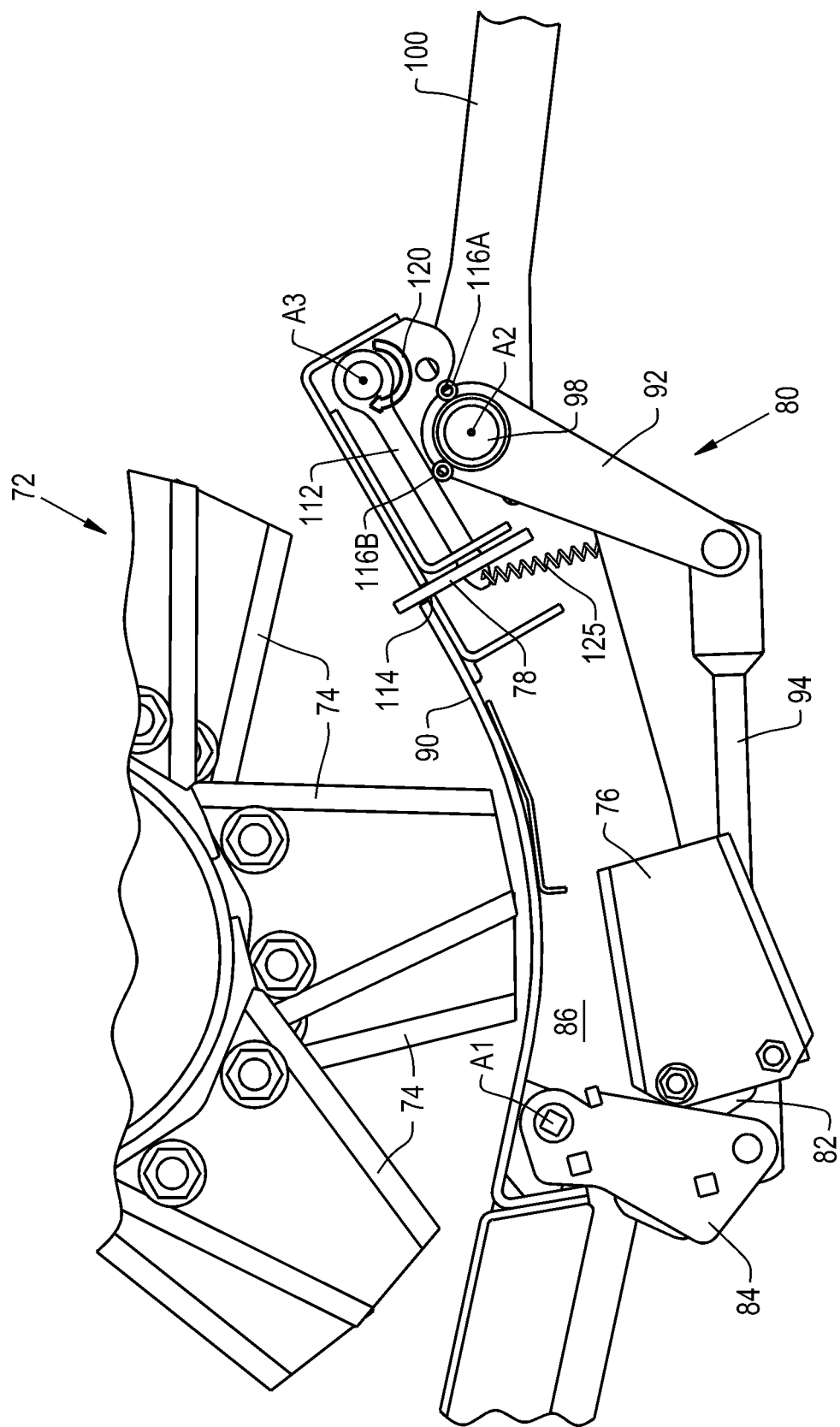
FIG. 9 is a sectional view of the chopper assembly shown in FIG. 8 with the shear bar in an engaged position and the counter knives in a disengaged position.

In another embodiment, and referring now to FIGS. 8-9, the chopper assembly 72 shown in FIGS. 2-5 has the linkage assembly 80 shown in FIGS. 2-5 with the addition of a secondary engagement cam 116B placed over the shaft 98 in addition to a primary engagement cam, referenced in FIGS. 8-9 as 116A. The secondary engagement cam 116B has a different circumferential position on the shaft 98 so that when the handle 100 has been pulled down, as shown in FIG. 8, the secondary engagement cam 116B can be lightly contacting or adjacent to the bar arm 112 but not camming the bar arm 112 so as to raise the shear bar 78 to an engaged position. When the handle 100 and linkage assembly 80 are in the position shown in FIG. 8, which is similar to the position of the handle 100 and linkage assembly 80 shown in FIG. 2, both the counter knives 76 and shear bar 78 are in the disengaged position. In some instances, it may be desired to raise the shear bar 78 without raising the counter knives 76, especially when some chopping of crop material is desired but the counter knives 76 would be damaged if used in conjunction with the rotating knives 74 to chop the crop material. The shear bar 78, which is relatively thick compared to each individual counter knife 76, can therefore allow some chopping action of the crop material to occur with a reduced risk of being damaged. To accomplish this, and referring now to FIG. 9, the handle 100 connected to the linkage assembly 80 can be pushed further down from the position shown in FIG. 8 to cause rotation of the shaft 98 that will rotate the secondary engagement cam 116B to cam the bar arm 112 and raise the shear bar 78. Rotation of the shaft 98 will also cause rotation of the knife arm 92 in the pivoting direction 108, causing linear movement of the linkage rod 94 in the linear direction 110 and further pivoting of the pivoting plate 84, knife carrier 82, and counter knives 76 in the pivoting direction 108. The counter knives 76 will therefore pivot further away from the engaged position shown in FIG. 3, allowing the shear bar 78 to be placed in the engaged position while the counter knives 76 are in a disengaged position. To put both the counter knives 76 and shear bar 78 in the engaged position, the handle 100 can be raised to the position shown in FIG. 3 so the counter knives 76 are pivoted into the engaged position by the knife arm 92 causing pivoting of the pivoting plate 84 and the primary engagement cam 116A engaging the bar arm 112 to raise the shear bar 78. It can therefore be seen that the handle 100 can have three positions affecting what elements are engaged when the secondary engagement cam 116B is included: a neutral position where the counter knives 76 and shear bar 78 are both in a disengaged position (shown in FIG. 8); a bar engaged position where the shear bar 78 is moved to the engaged position by the secondary engagement cam 116B and the counter knives 76 are in a disengaged position (shown in FIG. 9); and a bar and knife engaged position where the shear bar 78 is moved to the engaged position by primary cam 116A and the counter knives 76 are also moved to an engaged position (similar to FIG. 3). It should be appreciated that the secondary engagement cam 116B can also be rotated on the shaft 98 to allow the counter knives 76 to be engaged without engaging the shear bar 78, as previously described.

Figure 10:
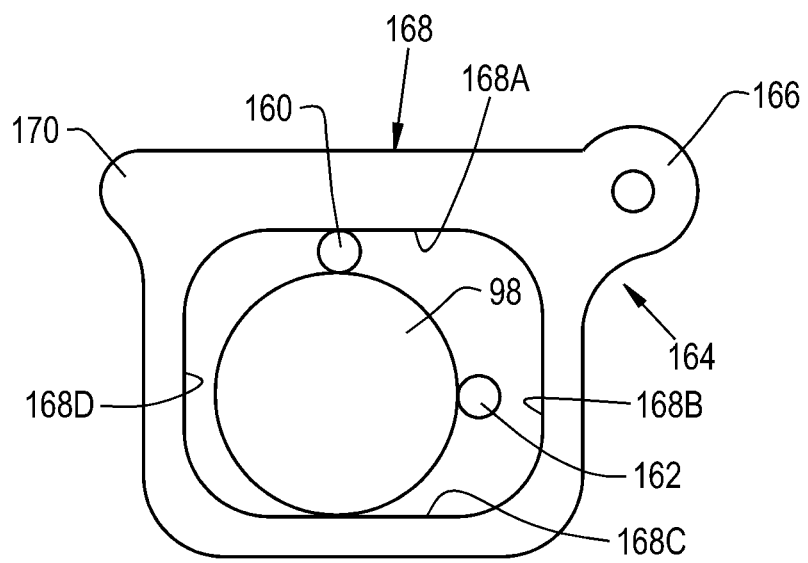
FIG. 10 is a cross-sectional view of a modified bar arm, an engagement cam, a disengagement cam and a shaft of a linkage assembly.
Figure 11:
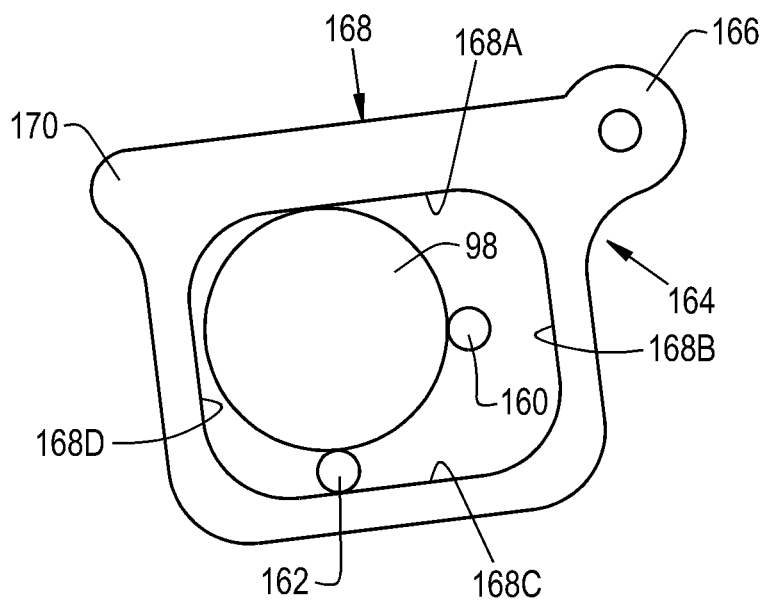
FIG. 11 is a cross-sectional view of the modified bar arm, engagement cam, disengagement cam, and shaft shown in FIG. 10 after the shaft has been rotated 90 degrees clockwise.

In yet another embodiment, and referring now to FIGS. 10-11, the linkage assembly 80 can include an engagement cam 160 and a disengagement cam 162 which are both rotated by the shaft 98 and a modified bar arm 164 that encircles the cams 160 and 162 and shaft 98. As can be seen, the bar arm 164 can include a pivoting portion 166 to allow the bar arm 164 to pivot, a surrounding portion 168 including surrounding walls 168A, 168B, 168C, and 168D to allow camming of the bar arm 164, and a bar connecting portion 170 that connects to the shear bar 78 and allows the shear bar 78 to be moved by the bar arm 164. As shown in FIG. 10, the shaft 98 has been rotated so that the engagement cam 160 has engaged surrounding wall 168A in order to force the bar connecting portion 170 and connected shear bar 78 up, placing the shear bar 78 in an engaged position so the shear bar 78 is in the crop material flow within the chopper assembly 72. When the shaft 98 is rotated clockwise, as shown in FIG. 11, the engagement cam 160 is rotated so that the engagement cam 160 is no longer engaging surrounding wall 168A and the disengagement cam 162 engages the surrounding wall 168C to force the bar connecting portion 170 and connected shear bar 78 down, retracting the shear bar 78 so that the shear bar 78 is no longer in the crop material flow. Such a configuration allows the engagement cam 160 to move the shear bar 78 into an engaged position when desired, but also allows the disengagement cam 162 to provide a positive disengagement force to retract the shear bar 78 when desired.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
   a chassis;
   a threshing and separating assembly carried by said chassis; and
   a chopper assembly carried by said chassis that receives crop material from said threshing and separating assembly, said chopper assembly including:
   at least one movable chopping knife;
   a plurality of counter knives movable between a first knife position and a second knife position, said plurality of counter knives configured to cooperate with said at least one chopping knife to cut crop material when in said first knife position;
   a shear bar movable between a first bar position and a second bar position; and
   a linkage assembly connected to said plurality of counter knives and said shear bar such that said linkage assembly is selectively actuable to simultaneously move said plurality of counter knives between said first knife position and said second knife position and said shear bar between said first bar position and said second bar position, wherein said linkage assembly includes a pivotable knife arm linked to said plurality of counter knives and a pivotable bellcrank linked to said shear bar and to said knife arm, wherein pivoting of said knife arm moves said plurality of counter knives between said first knife position and said second knife position and pivoting of said bellcrank moves said shear bar between said first bar position and said second bar position.

2. The agricultural harvester according to claim 1, wherein said shear bar is configured to impede a flow of crop material through said chopper assembly in said first bar position and be removed from said flow of crop material in said second bar position.

3. The agricultural harvester according to claim 2, wherein said plurality of counter knives do not cooperate with said at least one chopping knife in said second knife position.

4. The agricultural harvester according to claim 1, wherein said knife arm pivots about a first pivoting axis and said bellcrank pivots about a second pivoting axis that is not coincident with said first pivoting axis.

5. The agricultural harvester according to claim 1, wherein said linkage assembly is connected to and selectively actuable by at least one of a handle, a hydraulic actuator, a pneumatic actuator, and an electric actuator.

6. The agricultural harvester according to claim 1, wherein said bellcrank has a 90° angle between the connections to said knife arm and said shear bar.

7. A chopper assembly for an agricultural harvester, comprising:
   at least one movable chopping knife;
   a plurality of counter knives movable between a first knife position and a second knife position, said plurality of counter knives configured to cooperate with said at least one chopping knife to cut crop material when in said first knife position;
   a shear bar movable between a first bar position and a second bar position; and
   a linkage assembly connected to said plurality of counter knives and said shear bar such that said linkage assembly is selectively actuable to simultaneously move said plurality of counter knives between said first knife position and said second knife position and said shear bar between said first bar position and said second bar position, wherein said linkage assembly includes a pivotable knife arm linked to said plurality of counter knives and a pivotable bellcrank having an angle linked to said shear bar and to said knife arm, wherein pivoting of said knife arm moves said plurality of counter knives between said first knife position and said second knife position and pivoting of said bellcrank moves said shear bar between said first bar position and said second bar position.

8. The chopper assembly according to claim 7, wherein said bellcrank angle is a 90° angle between the connections to said knife arm and said shear bar.

* * * * *